(12) United States Patent
Kim et al.

(10) Patent No.: US 10,733,975 B2
(45) Date of Patent: Aug. 4, 2020

(54) OOS SENTENCE GENERATING METHOD AND APPARATUS

(71) Applicant: Samsung Electronics Co., Ltd., Suwon-si (KR)

(72) Inventors: Young-Seok Kim, Suwon-si (KR); Sang Hyun Yoo, Seoul (KR); Jehun Jeon, Suwon-si (KR); Junhwi Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 15/913,486

(22) Filed: Mar. 6, 2018

(65) Prior Publication Data

US 2019/0088250 A1    Mar. 21, 2019

(30) Foreign Application Priority Data

Sep. 18, 2017  (KR) .................. 10-2017-0119791

(51) Int. Cl.
*G10L 15/00*     (2013.01)
*G10L 15/065*    (2013.01)
*G10L 15/06*     (2013.01)
*G10L 15/22*     (2006.01)
*G10L 15/18*     (2013.01)
(Continued)

(52) U.S. Cl.
CPC ........ *G10L 15/063* (2013.01); *G06F 16/3344* (2019.01); *G06F 40/30* (2020.01); *G06F 40/56* (2020.01); *G06N 3/0454* (2013.01); *G06N 3/08* (2013.01); *G10L 15/1815* (2013.01); *G10L 15/22* (2013.01); *G10L 15/16* (2013.01); *G10L 15/18* (2013.01)

(58) Field of Classification Search
CPC ...... G10L 15/00; G10L 15/063; G10L 15/065
See application file for complete search history.

(56) References Cited

U.S. PATENT DOCUMENTS 5,895,447 A * 4/1999 Ittycheriah .......... G10L 15/07
                                                 704/231
6,389,395 B1 * 5/2002 Ringland ............ G10L 15/063
                                                 704/254
(Continued)

FOREIGN PATENT DOCUMENTS

KR       10-1309042 B1     9/2013

OTHER PUBLICATIONS

Extended European Serarch Report dated Feb. 5, 2019 in counterpart European Application No. 18189533.5 (7 pages in English).
(Continued)

*Primary Examiner* — Shreyans A Patel
(74) *Attorney, Agent, or Firm* — NSIP Law

(57) ABSTRACT

An out-of-service (OOS) sentence generating method includes: training models based on a target utterance template of a target service and a target sentence generated from the target utterance template; generating a similar utterance template that is similar to the target utterance template based on a trained model, among the trained models, and a sentence generated from an utterance template of another service; and generating a similar sentence that is similar to the target sentence based on another trained model, among the trained models, and the similar utterance template.

24 Claims, 11 Drawing Sheets

(51) Int. Cl.
*G06F 16/33* (2019.01)
*G06N 3/04* (2006.01)
*G06N 3/08* (2006.01)
*G06F 40/30* (2020.01)
*G06F 40/56* (2020.01)
*G10L 15/16* (2006.01)

(56) References Cited

U.S. PATENT DOCUMENTS

| | | | |
|---|---|---|---|
| 6,463,413 B1* | 10/2002 | Applebaum | G10L 15/06 704/243 |
| 7,254,529 B2 | 8/2007 | Gao et al. | |
| 8,135,589 B1* | 3/2012 | Reding | G10L 15/30 704/231 |
| 8,688,453 B1 | 4/2014 | Joshi et al. | |
| 8,706,491 B2 | 4/2014 | Chelba et al. | |
| 8,732,189 B2 | 5/2014 | Fujita et al. | |
| 8,942,470 B2 | 1/2015 | Ni et al. | |
| 9,436,759 B2 | 9/2016 | Huang et al. | |
| 10,319,377 B2* | 6/2019 | Panda | G10L 15/02 |
| 2004/0006461 A1* | 1/2004 | Gupta | G06F 17/289 704/200 |
| 2009/0083023 A1* | 3/2009 | Foster | G06F 40/45 704/3 |
| 2009/0276414 A1 | 11/2009 | Gao et al. | |
| 2014/0088964 A1* | 3/2014 | Bellegarda | G10L 15/063 704/243 |
| 2014/0214421 A1 | 7/2014 | Shriberg et al. | |
| 2015/0348551 A1* | 12/2015 | Gruber | G10L 15/1815 704/235 |
| 2016/0027433 A1* | 1/2016 | Itoh | G10L 15/065 704/9 |
| 2016/0055240 A1 | 2/2016 | Tur et al. | |
| 2016/0117316 A1* | 4/2016 | Le | G10L 15/16 704/9 |
| 2017/0256270 A1* | 9/2017 | Singaraju | G10L 25/84 |
| 2017/0371870 A1* | 12/2017 | Eck | G06F 40/47 |

OTHER PUBLICATIONS

Yoko Fujita, et al., "Out-of-Task Utterance Detection Based on Bag-of-Words Using Automatic Speech Recognition Results," *Proceedings of the Asia-Pacific Signal and Information Processing Association Annual Summit and Conference*, Oct. 2011, Xi'an, China (4 pages, in English).

Seonghan Ryu, et al., "Exploiting Out-of-Vocabulary Words for Out-of-Domain Detection in Dialog Systems," *Proceedings of the International Conference on Big Data and Smart Computing*, Jan. 2014, Bangkok, Thailand, pp. 165-168.

Gokhan Tur, et al., "Detecting Out-Of-Domain Utterances Addressed to a Virtual Personal Assistant," *Proceedings of the International Speech Communication Association*, Sep. 2014, Singapore, pp. 283-287.

Seonghan Ryu, et al., "Neural sentence embedding using only in-domain sentences for out-of-domain sentence detection in dialog systems," *Pattern Recognition Letters*, vol. 88, Mar. 2017, pp. 26-32.

* cited by examiner

"Translate photo captured in Jeju Island mostly recently"

OOS SENTENCE GENERATING METHOD AND APPARATUS

CROSS-REFERENCE TO RELATED APPLICATIONS

This application claims the benefit under 35 USC § 119(a) of Korean Patent Application No. 10-2017-0119791 filed on Sep. 18, 2017 in the Korean Intellectual Property Office, the entire disclosure of which is incorporated herein by reference for all purposes.

BACKGROUND

1. Field

The following description relates to generating an out-of-service (OOS) sentence.

2. Description of Related Art

An autoencoder may encode an input, generate a vector corresponding to the input, and decode the vector to generate an output corresponding to the input. The autoencoder may be trained to minimize a restoration error based on an in-service (IS) input of a service. In response to a restoration error for an input being greater than a threshold value, an autoencoder model may determine the input to be an out-of-service (OOS) input of a service. In response to the restoration error being less than or equal to the threshold value, the autoencoder model may determine the input to be an IS input of the service. The threshold value may be determined while the autoencoder model is being trained, and may vary based on an input, for example, training data.

In response to a determination that the input is the IS input, a classifier may determine an intent of the input.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an out-of-service (OOS) sentence generating method includes: training models based on a target utterance template of a target service and a target sentence generated from the target utterance template; generating a similar utterance template that is similar to the target utterance template based on a trained model, among the trained models, and a sentence generated from an utterance template of another service; and generating a similar sentence that is similar to the target sentence based on another trained model, among the trained models, and the similar utterance template.

The method may further include: allocating, to an intent of the similar sentence, an OOS label of the target service.

The OOS label may indicate that the target service is not able to perform a function corresponding to the similar sentence.

The training of the models may include inputting the target sentence to a first model among the models, and training the first model to generate the target utterance template based on the target sentence, and inputting the target utterance template to a second model among the models, and training the second model to generate the target sentence based on the target utterance template.

The trained first model may be a model used to generate the similar utterance template. The trained second model may be a model used to generate the similar sentence.

The trained second model may be configured to generate the similar sentence based on a corpus through training and the similar utterance template.

The method may further include: training a classifier configured to classify an intent of an input sentence based on the target sentence and the similar sentence.

The trained classifier may be configured to receive, as an input, a sentence corresponding to a speech signal of a user, determine the intent of the input sentence, and output a result indicating that a function corresponding to the determined intent is not to be performed, in response to the determined intent corresponding to an OOS label of the target service.

In another general aspect, a non-transitory computer-readable storage medium stores instructions that, when executed by a processor, cause the processor to perform the method described above.

In another general aspect, a computing apparatus includes: a processor configured to train models based on a target utterance template of a target service and a target sentence generated from the target utterance template, generate a similar utterance template that is similar to the target utterance template based on a trained model, among the trained models, and a sentence generated from an utterance template of another service, and generate a similar sentence that is similar to the target sentence based on another trained model, among the trained models, and the similar utterance template.

The processor may be further configured to allocate, to an intent of the similar sentence, an out-of-service (OOS) label of the target service.

The OOS label may indicate that the target service is not able to perform a function corresponding to the similar sentence.

The processor may be further configured to input the target sentence to a first model among the models and train the first model to generate the target utterance template based on the target sentence, and input the target utterance template to a second model among the models and train the second model to generate the target sentence based on the target utterance template.

The trained first model may be a model used to generate the similar utterance template. The trained second model may be a model used to generate the similar sentence.

The trained second model may be configured to generate the similar sentence based on a corpus through training and the similar utterance template.

The processor may be further configured to train a classifier configured to classify an intent of an input sentence based on the target sentence and the similar sentence.

The trained classifier may be configured to receive, as an input, sentence data corresponding to a speech signal of a user, determine an intent of the sentence data, and output a result indicating that a function corresponding to the determined intent is not to be performed, in response to the determined intent corresponding to an OOS label of the target service.

In another general aspect, an instruction execution method includes: identifying a service associated with an input sentence; determining an intent of the input sentence using a classifier corresponding to the identified service; and performing one of a function corresponding to the determined intent and processing of the input sentence as an error, based on whether the response to the determined intent is out-of-service (OOS).

The classifier may be trained in advance based on a target sentence of the identified service and a similar sentence that is similar to the target sentence.

The in similar sentence may be generated by training models based on a target utterance template of the identified service and the target sentence generated from the target utterance template, generating a similar utterance template that is similar to the target utterance template based on a first model, among the trained models, and a sentence generated from an utterance template of another service, and generating the similar sentence that is similar to the target sentence based on a second model, among the trained models, and the similar utterance template.

The performing of the one of the function corresponding to the determined intent and the processing of the input sentence as an error may include performing the function corresponding to the determined intent, in response to the determined intent not being OOS.

The performing of the one of the function corresponding to the determined intent and the processing of the input sentence as an error may include performing the processing of the input sentence as an error, in response to the determined intent being OOS.

In another general aspect, a non-transitory computer-readable storage medium stores instructions that, when executed by a processor, cause the processor to perform the method described above.

In another general aspect, an instruction execution method includes: identifying, by an instruction execution system, an application operable by the instruction execution system and associated with an input sentence; determining, by the instruction execution system, an intent of the input sentence to be out-of-service (OOS) with respect to the identified application using a classifier corresponding to the identified application; and refusing, by the instruction execution system, to perform a function corresponding to the input sentence, in response to the determined intent being OOS with respect to the identified application.

Other features and aspects will be apparent from the following detailed description, the drawings, and the claims.

Figure 1:
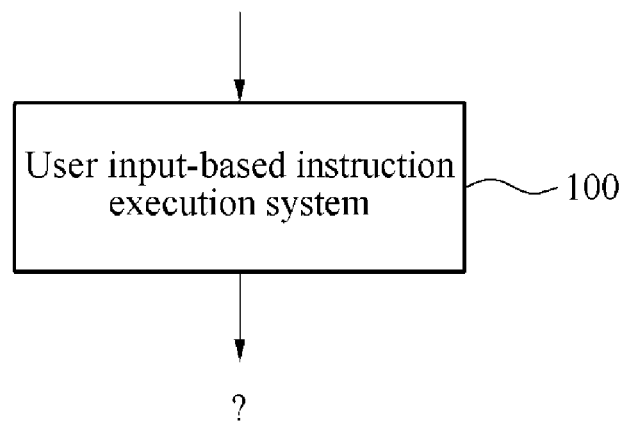
FIG. 1 is a diagram illustrating an example of a user input-based instruction execution system.

Throughout the drawings and the detailed description, the same drawing reference numerals will be understood to refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the disclosure.

FIG. 1 is a diagram illustrating an example of a user input-based instruction execution system.

A user input-based instruction execution system 100 may identify a service associated with an input by a user, determine a function requested through the input by the user among functions of the identified service, and perform the determined function. A service described herein may also be referred to as an application.

For example, when the instruction execution system 100 receives, as an input, a first sentence "show me a photo captured in Jeju Island most recently," the instruction execution system 100 identifies a service or application associated with the first sentence as a gallery application. The instruction execution system 100 determines a function requested through the first sentence to be a 'display function' based on the word combination "show me" included in the first sentence, and performs the determined function to display at least one photo mostly recently captured in Jeju Island on a user terminal through the gallery application. The gallery application displays the photo, and thus the first sentence corresponds to a target sentence or an in-service (IS) sentence for the gallery application.

For another example, when the instruction execution system 100 receives, as an input, a second sentence "send a message to my father," the instruction execution system 100 identifies a service or application associated with the second sentence as a messaging application. The instruction execution system 100 determines a function requested through the second sentence to be a 'send function' based on the word "send" included in the second sentence, and performs the determined function to send a message to a terminal of a father of a user through the messaging application. The messaging application sends the message, and thus the second sentence corresponds to a target sentence or an IS sentence for the messaging application.

In the example illustrated in FIG. 1, the instruction execution system 100 receives, as an input, a third sentence "translate a photo captured in Jeju Island mostly recently." The instruction execution system 100 identifies an application associated with the third sentence as a gallery application because the third sentence includes the word "photo." However, the gallery application does not translate the photo, and thus the third sentence corresponds to an out-of-service (OOS) sentence in the gallery application. The instruction execution system 100 may not recognize that the third sentence is an OOS sentence in the gallery application. Thus, the instruction execution system 100 may then determine a function requested through the third sentence, and perform the determined function. For example, the instruction execution system 100 recognizes the word "translate" in the third sentence as a word "trash" and determines the function requested through the third sentence to be a 'delete function.' Thus, the instruction execution system 100 deletes at least one photo most recently captured in Jeju Island most recently. Such an example may occur when the instruction execution system 100 does not refuse to perform (e.g., reject) a function corresponding to an input by a user although such an input is OOS in the gallery application.

However, an instruction execution system 900 to be described with reference to FIG. 9 may refuse to perform a function corresponding to a user input, when the user input corresponds to an OOS sentence in an application or service, hereinafter referred to as a target service. Thus, a performance of rejecting a function corresponding to an OOS sentence of a target service may be improved. In an example, the instruction execution system 900 has such an improved performance because the instruction execution system 900 includes a classifier that is trained based on a target sentence, or an IS sentence, of a target service and an OOS sentence of the target service.

To train the classifier, the target sentence and the OOS sentence of the target service may need to be generated. Hereinafter, a method to generate a target sentence will be described with reference to FIG. 2, and a method and an apparatus to generate an OOS sentence will be described with reference to FIGS. 3 through 5. In addition, training a classifier will be described with reference to FIG. 6.

Figure 2:
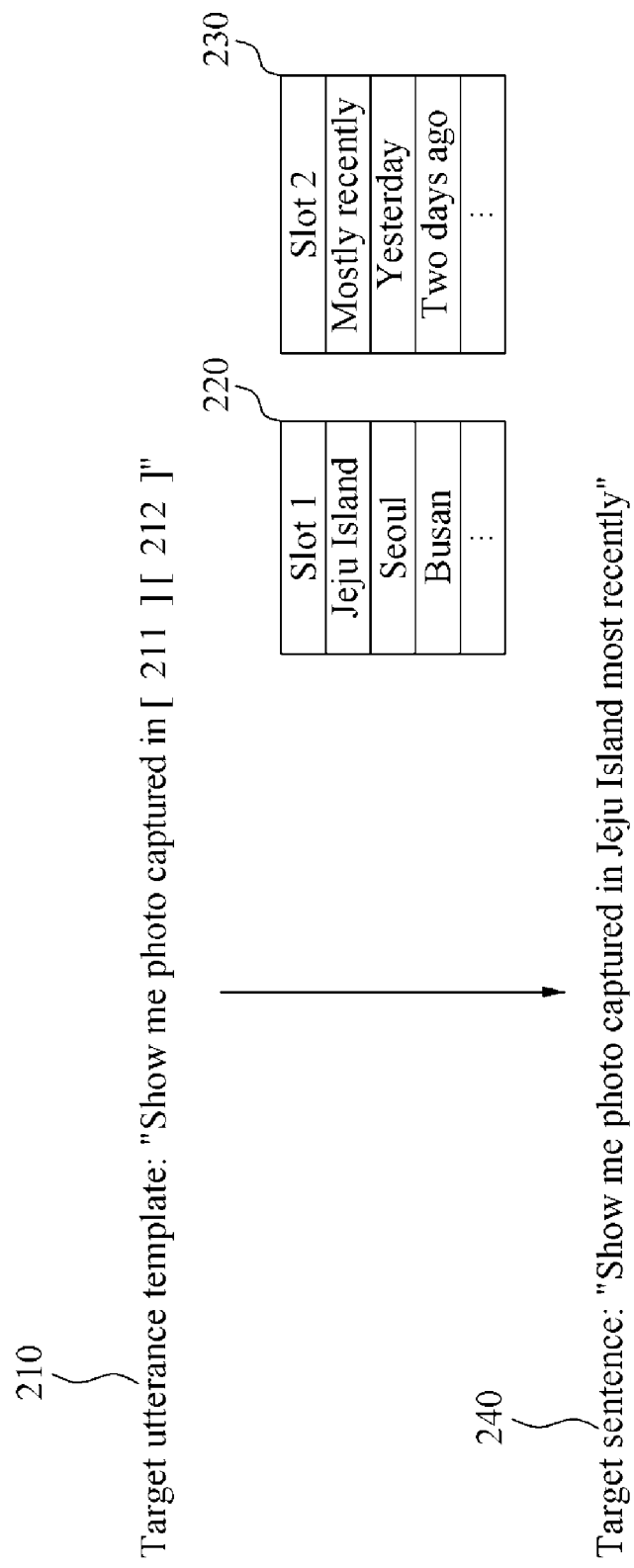
FIG. 2 is a diagram illustrating an example of a target sentence generating method.

FIG. 2 is a diagram illustrating an example of a target sentence generating method.

The target sentence generating method is, for example, performed by a target sentence generating apparatus. The target sentence generating apparatus generates a target sentence based on a target utterance template of a target service. The target utterance template described herein is a template used to generate the target sentence.

FIG. 2 illustrates an example of how the target sentence generating apparatus generates a target sentence of a gallery application, which is a target service.

Referring to FIG. 2, the target sentence generating apparatus generates a target sentence 240 by filling in a slot 211 in a target utterance template 210 with one of words or word combinations in a list 220, and filling in a slot 212 in the target utterance template 210 with one of words or word combinations in a list 230. For example, as illustrated, the target sentence generating apparatus generates the target sentence 240, for example, "show me a photo captured in Jeju Island most recently," by filling in the slot 211 with the word combination "Jeju Island" in the list 220 and the slot 212 with the word combination "most recently" in the list 230. For another example, the target sentence generating apparatus generates a target sentence "show me a photo captured in Seoul two days ago" by filling in the slot 211 with the word "Seoul" in the list 220 and the slot 212 with the word combination "two days ago" in the list 230.

Although a single target utterance template, for example, the target utterance template 210, and a single target sentence, for example, the target sentence 240, are illustrated in FIG. 2, these are provided merely as illustrative examples, and thus the target sentence generating apparatus may generate multiple target sentences from multiple target utterance templates of a target service.

Figure 3:
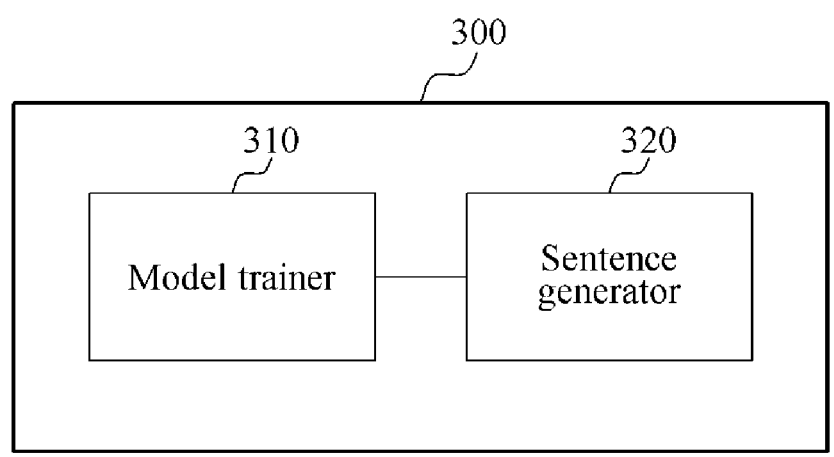
FIG. 3 is a diagram illustrating an example of an out-of-service (OOS) sentence generating apparatus.

FIG. 3 is a diagram illustrating an example of an OOS sentence generating apparatus 300.

Referring to FIG. 3, the OOS sentence generating apparatus 300 includes a model trainer 310 and a sentence generator 320.

Figure 4:
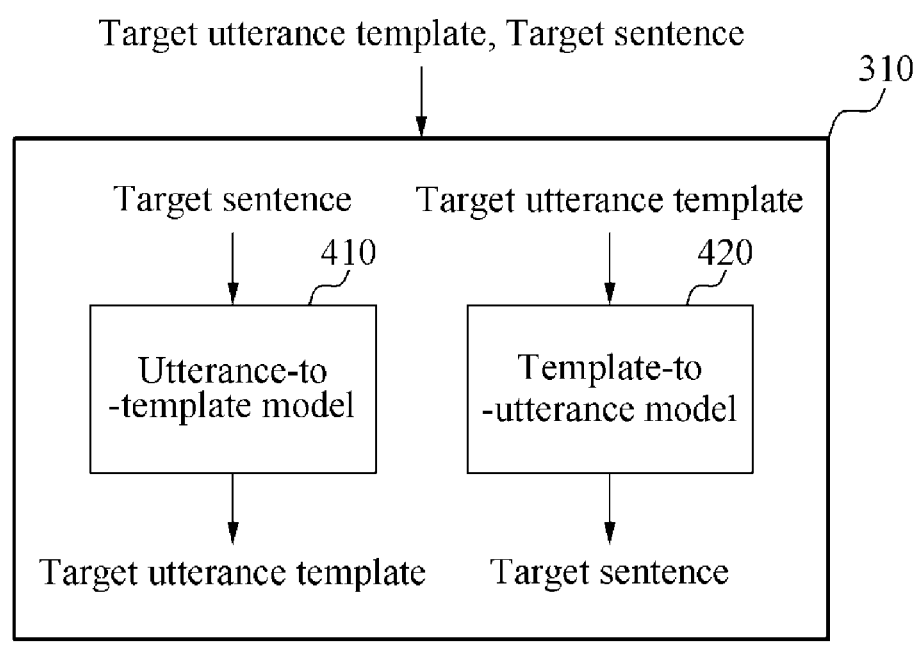
FIGS. 4 and 5 are diagrams illustrating examples of operations of the out-of-service (OOS) sentence generating apparatus.

The model trainer 310 trains models based on the target utterance template 210 and the target sentence 240. Referring to FIG. 4, the model trainer 310 inputs the target sentence 240 to an utterance-to-template model 410. The utterance-to-template model 410 is, for example, a multiple neural network model having a sequence-to-sequence structure. The model trainer 310 trains the utterance-to-template model 410 such that the utterance-to-template model 410 generates the target utterance template 210 from the target sentence 240. However, the disclosure is not limited to the foregoing examples, and the model trainer 310 may also train the utterance-to-template model 410 to generate one or more target utterance templates from one or more target sentences. The model trainer 310 inputs the target utterance template 210 to a template-to-utterance model 420. The template-to-utterance model 420 is, for example, a multiple neural network having a sequence-to-sequence structure. The model trainer 310 trains the template-to-utterance model 420 such that the template-to-utterance model 420 generates the target sentence 240 from the target utterance template 210. However, the disclosure is not limited to the foregoing examples, and the model trainer 310 may also train the template-to-utterance model 420 to generate one or more target sentences from one or more target utterance templates.

The sentence generator 320 generates a similar utterance template that is similar to the target utterance template 210 based on the utterance-to-template model 410 among the trained models and a sentence generated from an utterance template of another service. In addition, the sentence generator 320 generates a similar sentence that is similar to the target sentence 240 based on the template-to-utterance model 420 among the trained models and the generated similar utterance template. A similar sentence described herein is an OOS sentence described above with reference to FIG. 1, which is similar to a target sentence yet OOS in a target service. That is, the similar sentence may correspond to an input requesting a function that is not available in the target service or not to be performed in the target service, although the similar sentence is associated with the target service.

Figure 5:
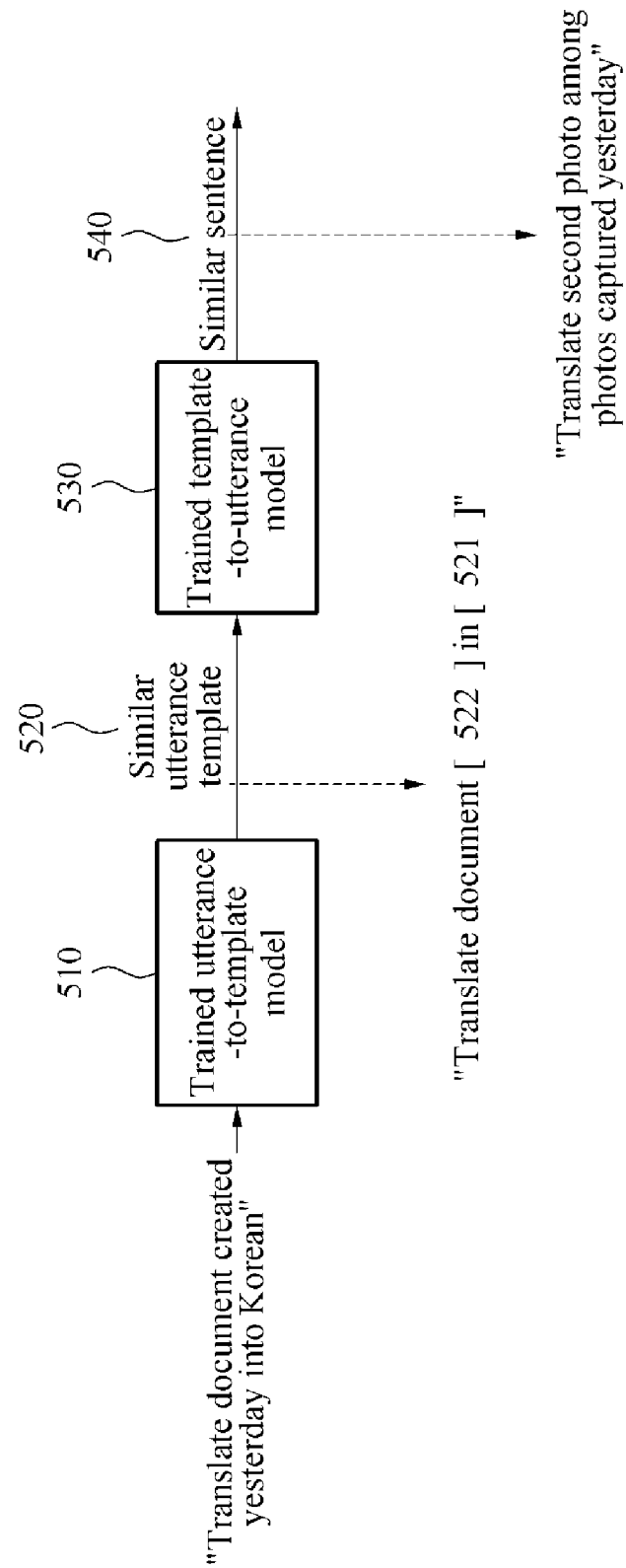

As illustrated in FIG. 5, the sentence generator 320 inputs, to a trained utterance-to-template model 510, a sentence "translate a document created yesterday into Korean" of another service, for example, a translation service. A sentence of another service described herein may be generated from an utterance template of the other service. For example, when the utterance template of the other service is "translate [ ] created [ ] into Korean," the target sentence generating apparatus described above with reference to FIG. 2 generates the sentence of the other service "translate a document created yesterday into Korean" by filling in the slots in the utterance template of the other service with the word "document" and the word "yesterday," respectively.

The sentence generator 320 generates a similar utterance template 520 "translate a document [ ] in a [ ]" that is similar to the target utterance template 210. As described with reference to FIGS. 3 and 4, the trained utterance-to-template model 510 is trained based on the target utterance template 210 and the target sentence 240, and thus generates the similar utterance template 520 that is similar to the target utterance template 210 although a sentence of another service, in lieu of the target sentence 240, is input.

The sentence generator 320 inputs the similar utterance template 520 to a trained template-to-utterance model 530. The sentence generator 320 generates a similar sentence 540 "translate a second photo among photos captured yesterday" that is similar to the target sentence 240 through the trained template-to-utterance model 530. As described with reference to FIGS. 3 and 4, the trained template-to-utterance model 530 is trained based on the target utterance template 210 and the target sentence 240, and possesses a corpus including the word "photo" that is seen through training. When the trained template-to-utterance model 530 receives, as an input, the similar utterance template 520, the trained template-to-utterance model 530 generates the similar sentence 540 that is similar to the target sentence 240 by filling in slots 521 and 522 of the similar utterance template 520 with words included in the corpus. Thus, the sentence generator 320 generates the similar sentence 540 that is similar to the target sentence 240, but OOS in a target service.

The OOS sentence generating apparatus 300 allocates an OOS label to an intent of the similar sentence 540. The OOS label described herein is a label indicating that the target service is not able to perform a function corresponding to the similar sentence 540 or a function requested through the similar sentence 540. In the example of FIG. 5, an OOS label to be allocated to the similar sentence 540 indicates that a gallery application is not able to perform a translation function.

As described above with reference to FIG. 1, a classifier may be trained based on the target sentence 240 and an OOS sentence, for example, the similar sentence 540. Hereinafter, an example of training such a classifier will be described with reference to FIG. 6.

Figure 6:
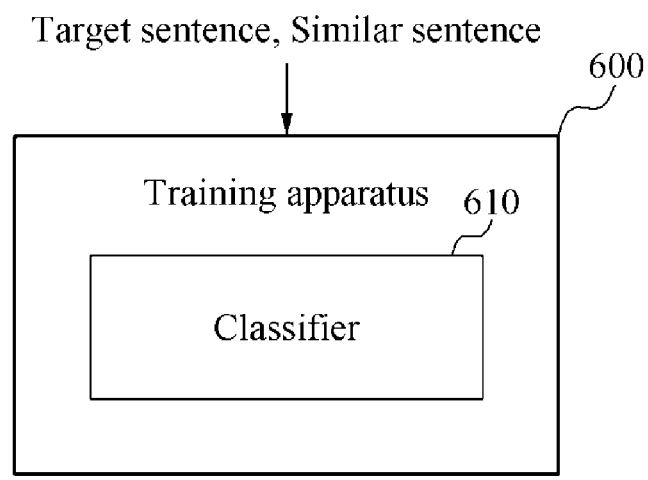
FIG. 6 is a diagram illustrating an example of a training apparatus.

FIG. 6 is a diagram illustrating an example of a training apparatus 600.

Referring to FIG. 6, the training apparatus 600 trains a classifier 610 configured to determine an intent of an input or a function requested through the input, based on the target sentence 240 and the similar sentence 540. The classifier 610 is, for example, a multiple neural network model.

The training apparatus 600 inputs the target sentence 240 to the classifier 610, and trains the classifier 610 to determine an actual intent of the target sentence 240 or a function requested through the target sentence 240. For example, the training apparatus 600 trains the classifier 610 such that the classifier 610 determines a function requested through the target sentence 240 "show me a photo captured in Jeju Island most recently" to be a 'display function.'

The training apparatus 600 inputs the similar sentence 540 to the classifier 610, and trains the classifier 600 to output a result indicating that a function corresponding to the similar sentence 540 or a function requested through the similar sentence 540 is not to be performed. For example, when the classifier 610 receives, as an input, the similar sentence 540 "translate a second photo among photos captured yesterday," the classifier 610 analyzes the similar sentence 540 and determine an intent of the similar sentence 540 or a function corresponding to the similar sentence 540 to be OOS. The classifier 610 then determines the intent of the similar sentence 540 or the function corresponding to the similar sentence 540 to be OOS, and thus outputs a result indicating that a gallery application, which is a target service, is not able to perform a translation function. Thus, the training apparatus 600 trains the classifier 610 to output a result indicating that a target service is not able to perform a function corresponding to a similar sentence or a function requested through the similar sentence.

For example, a trained classifier is provided in the instruction execution system 900 to be described with reference to FIG. 9.

Figure 7:
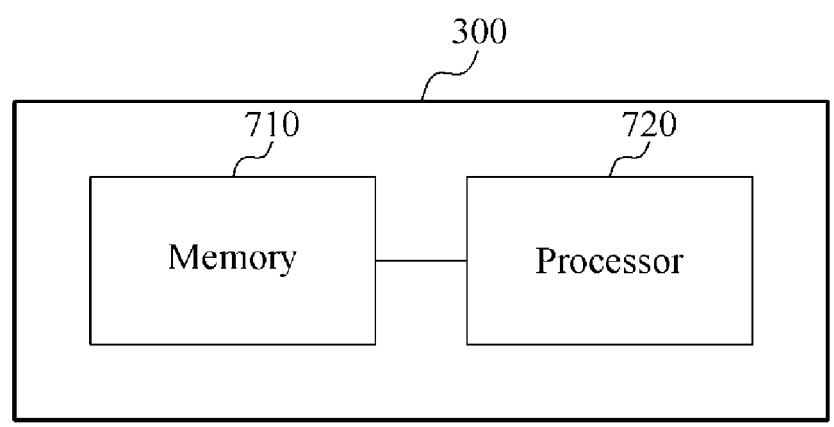
FIG. 7 is a diagram illustrating a further example of the OOS sentence generating apparatus.

FIG. 7 is a diagram illustrating a further example of the OOS sentence generating apparatus 300.

Referring to FIG. 7, the OOS sentence generating apparatus 300 is a computing apparatus including a memory 710 and a processor 720.

The processor 720 may include the model trainer 310 and the sentence generator 320. In an example, the processor 720 trains the models 410 and 420 based on the target utterance template 210 of the target service and the target sentence 240. The processor 720 inputs the target sentence 240 to a first model of the models 410 and 420, and trains the first model to generate the target utterance template 210 based on the target sentence 240. The first model may be the utterance-to-template model 410. In addition, the processor 720 inputs the target utterance template 210 to a second model of the models 410 and 420, and trains the second model to generate the target sentence 240 based on the target utterance template 210. The second model may be the template-to-utterance model 420. The processor 720 generates the similar utterance template 520 that is similar to the target utterance template 210 based on the trained utterance-to-template model 510 of the trained models 510 and 530 and a sentence generated from an utterance template of another service. The processor 720 generates the similar sentence 540 that is similar to the target sentence 240 based on the trained template-to-utterance model 530 of the trained models 510 and 530 and the similar utterance template 520.

The memory 710 stores the target utterance template 210 and the target sentence 240, and also stores the similar utterance template 520 and the similar sentence 540. The memory 710 may include a computer-readable storage medium or a computer-readable storage device. The memory 710 includes, for example, a random access memory (RAM), a dynamic RAM (DRAM), a static RAM (SRAM), or other types of nonvolatile memories well-known in the related fields of art.

The OOS sentence generating apparatus 300 may include the target sentence generating apparatus and/or the training apparatus 600 that are described herein. According to an example, the target sentence generating apparatus, the OOS sentence generating apparatus 300, and the training apparatus 600 may be logically distinguished from one another in a single physical apparatus, or physically distinguished or separate from one another.

Figure 11:
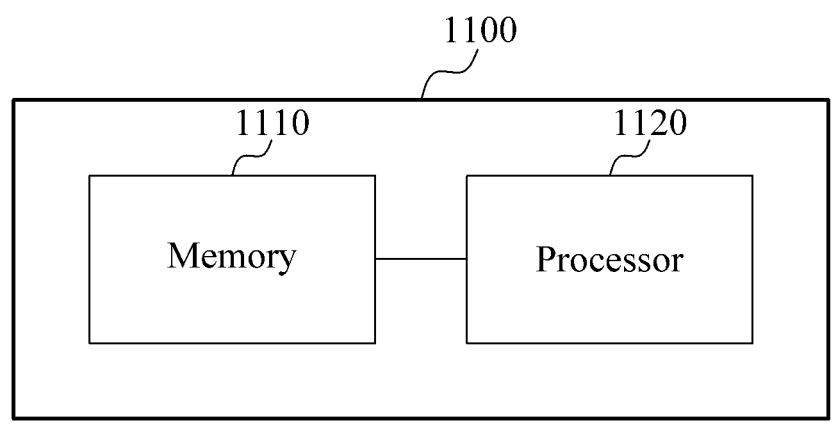
FIG. 11 is a diagram illustrating an example of a target sentence generating apparatus.

FIG. 11 is an example of a target sentence generating apparatus 1100, which is physically distinguished or separate from the sentence generating apparatus 300 and the training apparatus 600. Referring to FIGS. 2 and 11, the target sentence generating apparatus 1100 includes a memory 1110 configured to store the target utterance template 210, the list 220, and the list 230, and a processor 1120 configured to generate the target sentence 240 by filling the slots 211 and 212 in the target utterance template 210 with words or word combinations from the lists 220 and 230.

The descriptions provided with reference to FIGS. 1 through 6 may be applicable hereto, and thus a more detailed and repeated description is omitted here for clarity and brevity.

Figure 8:
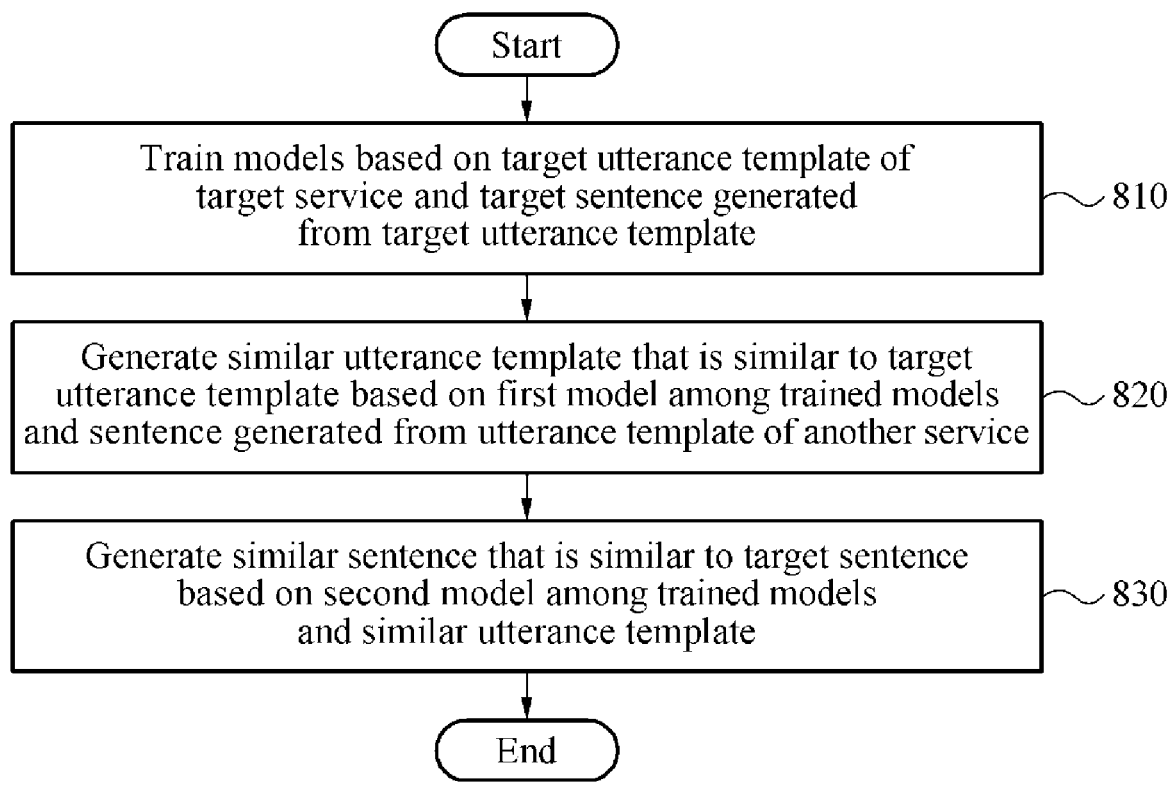
FIG. 8 is a flowchart illustrating an example of an OOS sentence generating method.

FIG. 8 is a flowchart illustrating an example of an OOS sentence generating method.

Referring to FIG. 8, in operation 810, the OOS sentence generating apparatus 300 trains the models 410 and 420 based on the target utterance template 210 of the target service and the target sentence 240.

In operation 820, the OOS sentence generating apparatus 300 generates the similar utterance template 520 that is similar to the target utterance template 210 based on the trained utterance-to-template model 510 of the trained models 510 and 530 and a sentence generated from an utterance template of another service.

In operation 830, the OOS sentence generating apparatus 300 generates the similar sentence 540 that is similar to the target sentence 240 based on the trained template-to-utterance model 530 of the trained models 510 and 530 and the similar utterance template 520.

The descriptions provided with reference to FIGS. 1 through 7 may be applicable to the operations described above with reference to FIG. 8, and thus a more detailed and repeated description is omitted here for clarity and brevity.

Figure 9:
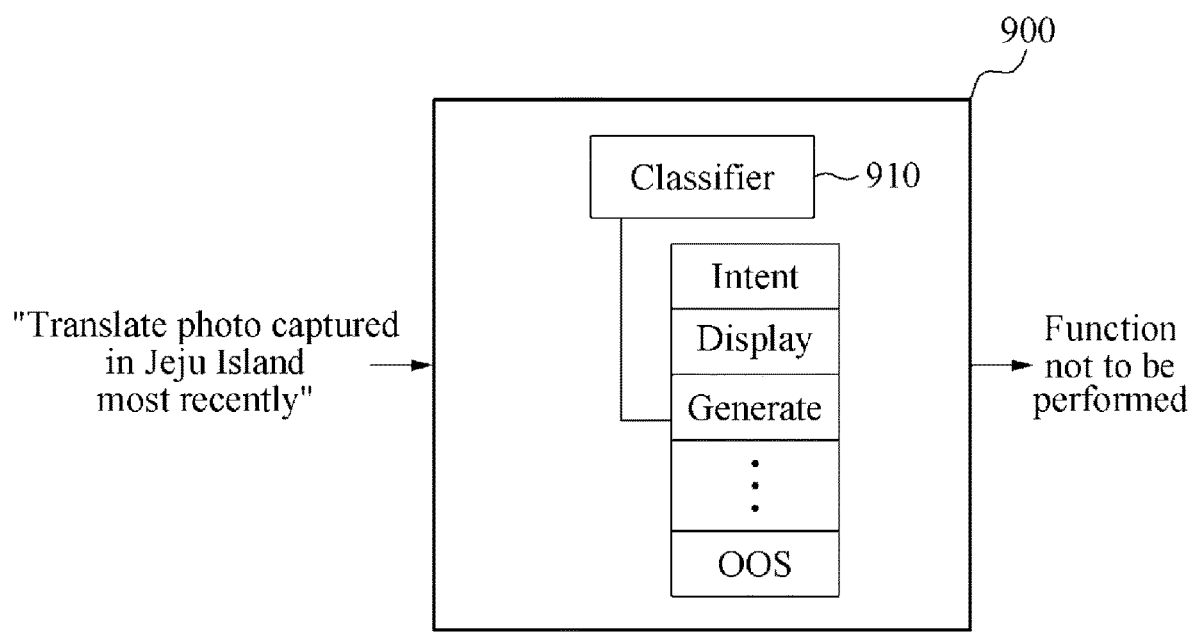
FIG. 9 is a diagram illustrating an example of an instruction execution system.

FIG. 9 is a diagram illustrating an example of a user input-based instruction execution system 900.

The instruction execution system 900 may also be referred to as, for example, a command implementing apparatus, a natural language analyzing apparatus, or a natural language understanding (NLU) engine.

The instruction execution system 900 may be embodied in a form including a client and a server. The client described herein is an apparatus configured to receive an utterance or a speech of a user, and transmit a speech signal corresponding to the utterance to the server. The client is, for example, a user terminal such as a smartphone, or a tablet. In addition, the instruction execution system 900 may be a client or a server.

Referring to FIG. 9, the instruction execution system 900 includes a classifier 910. For example, the classifier 910 is a classifier trained in advance based on the target sentence 240 and the similar sentence 540. However, the classifier 910 is not limited to such an example, and thus the classifier 910 may be a classifier trained based on multiple target sentences and multiple similar sentences.

For example, as illustrated, the instruction execution system 900 receives a sentence "translate a photo captured in Jeju Island most recently." The input sentence may be generated when an utterance or a speech of a user is recognized through speech recognition. The instruction execution system 900 identifies, as a gallery application, an application or a service associated with the input sentence. The instruction execution system 900 determines a function requested through the input sentence or an intent of the input sentence. For example, as illustrated in FIG. 9, because the classifier 910 has already seen the words "photo" and "translate" in the input sentence through training a similar sentence of the gallery application, or a similar sentence having an OOS label, for example, "translate a second photo among photos captured yesterday," the classifier 910 determines an intent of the input sentence or a function requested through the input sentence to be OOS. Thus, the classifier outputs a result indicating that an instruction corresponding to the determined intent or the determined function cannot be performed. The instruction execution system 900 provides a user with feedback indicating that the function is not to be performed based on the output of the classifier 910.

Dissimilar to the example illustrated in FIG. 9, an input sentence may include an unseen word that is not seen by the classifier 910 through training. In such a case, the classifier 910 determines a function requested through the input sentence or an intent of the input sentence based on a word most similar to the unseen word. In response to the determined function or intent corresponding to an OOS label, the classifier 910 outputs a result indicating that the determined function cannot be performed. For example, when the classifier 910 receives an input sentence "transform a photo captured in Jeju Island most recently," the classifier 910 estimates the word "transform" to be a most similar word "translate" because the classifier 910 has not seen the word "transform" through training. The classifier 910 then determines an intent of the input sentence or a function requested through the input sentence to be OOS based on the estimated word "translate" and the already seen word "photo." Thus, an OOS label is determined from the determined intent or the determined function, and the classifier 910 then outputs a result indicating that an instruction corresponding to the determined intent or the determined function cannot be performed.

In an example, the instruction execution system 900 refuses to perform an instruction corresponding to an OOS utterance that cannot be performed in an application or a service, and thus performance of rejecting an OOS input is further improved.

Figure 10:
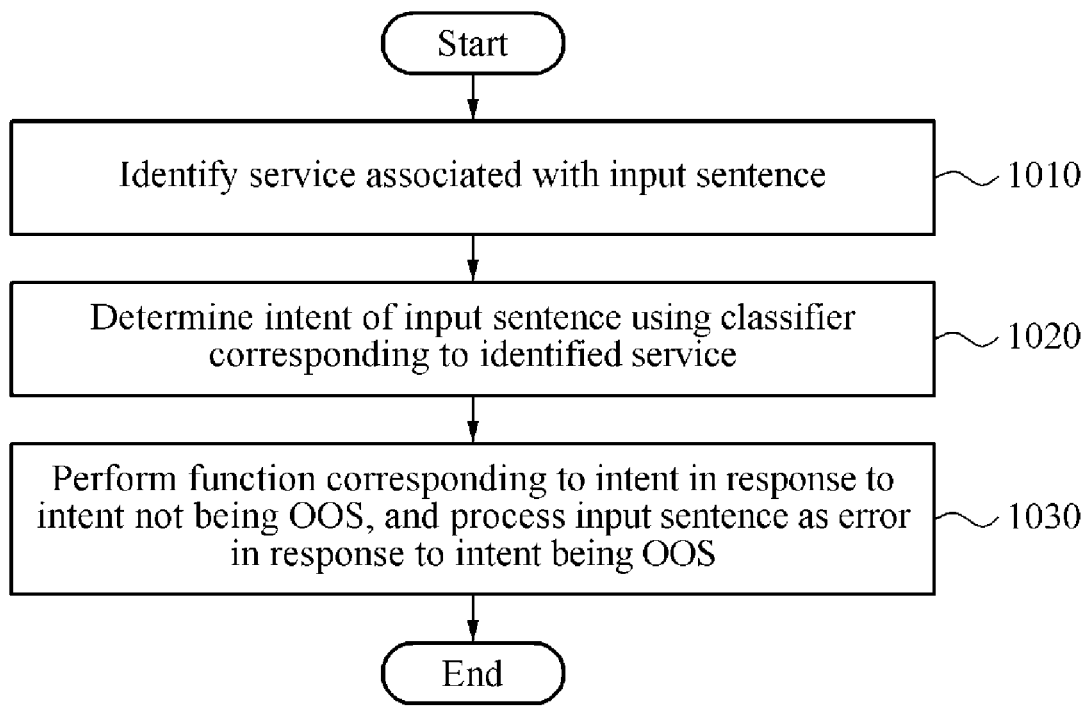
FIG. 10 is a flowchart illustrating an example of an instruction execution method.

FIG. 10 is a flowchart illustrating an example of an instruction execution method.

Referring to FIG. 10, in operation 1010, the instruction execution system 900 identifies a service associated with an input sentence. For example, in response to the input sentence "translate a photo captured in Jeju Island most recently," the instruction execution system 900 identifies the service associated with the input sentence as a gallery application based on the word "photo" included in the input sentence.

In operation 1020, the instruction execution system 900 determines an intent of the input sentence or a function corresponding to the intent of the input sentence, using a classifier corresponding to the identified service. For example, the instruction execution system 900 determines an intent of the input sentence "translate a photo captured in Jeju Island most recently" or a function requested through the input sentence to be OOS in the identified service.

In operation 1030, the instruction execution system 900 performs the function in response to the determined intent or function not being OOS, or processes the input sentence as an error in response to the determined intent or function being OOS. That is, in response to the determined intent or function being OOS, the instruction execution system 900 refuses to perform the function corresponding to the input sentence. For example, the intent of the input sentence "translate a photo captured in Jeju Island most recently" is OOS, and thus the instruction execution system 900 refuses to perform a function corresponding to the input sentence "translate a photo captured in Jeju Island most recently."

The descriptions provided with reference to FIGS. 1 through 9 may be applicable to the operations described above with reference to FIG. 10, and thus a more detailed and repeated description is omitted here for clarity and brevity.

The instruction execution system 100 in FIG. 1, the sentence generating apparatus 300, the model trainer 310, and the sentence generator 320 in FIG. 3, the training apparatus 600, and the classifier 610 in FIG. 6, the sentence generating apparatus 300, the memory 710, and the processor 720 in FIG. 7, the instruction execution system 900, and the classifier 910 in FIG. 9, and the target sentence generating apparatus 1100, the memory 1110, and the processor 1120 in FIG. 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 4, 5, 8, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An out-of-service (OOS) sentence generating method, comprising:
    training models based on a target utterance template of a target service and a target sentence generated from the target utterance template;
    generating a similar utterance template that is similar to the target utterance template based on a trained model, among the trained models, and a sentence generated from an utterance template of another service; and
    generating a similar sentence that is similar to the target sentence based on another trained model, among the trained models, and the similar utterance template.

2. The method of claim 1, further comprising:
    allocating, to an intent of the similar sentence, an OOS label of the target service.

3. The method of claim 2, wherein the OOS label indicates that the target service is not able to perform a function corresponding to the similar sentence.

4. The method of claim 1, wherein the training of the models comprises
    inputting the target sentence to a first model among the models, and training the first model to generate the target utterance template based on the target sentence, and
    inputting the target utterance template to a second model among the models, and training the second model to generate the target sentence based on the target utterance template.

5. The method of claim 4, wherein
    the trained first model is a model used to generate the similar utterance template, and
    the trained second model is a model used to generate the similar sentence.

6. The method of claim 4, wherein the trained second model is configured to generate the similar sentence based on a corpus through training and the similar utterance template.

7. The method of claim 1, further comprising:
    training a classifier configured to classify an intent of an input sentence based on the target sentence and the similar sentence.

8. The method of claim 7, wherein the trained classifier is configured to
    receive, as an input, a sentence corresponding to a speech signal of a user,
    determine the intent of the input sentence, and
    output a result indicating that a function corresponding to the determined intent is not to be performed, in response to the determined intent corresponding to an OOS label of the target service.

9. A non-transitory computer-readable storage medium storing instructions that, when executed by a processor, cause the processor to perform the method of claim 1.

10. A computing apparatus, comprising:
    a processor configured to
        train models based on a target utterance template of a target service and a target sentence generated from the target utterance template,
        generate a similar utterance template that is similar to the target utterance template based on a trained model, among the trained models, and a sentence generated from an utterance template of another service, and
        generate a similar sentence that is similar to the target sentence based on another trained model, among the trained models, and the similar utterance template.

11. The computing apparatus of claim 10, wherein the processor is further configured to allocate, to an intent of the similar sentence, an out-of-service (OOS) label of the target service.

12. The computing apparatus of claim 11, wherein the OOS label indicates that the target service is not able to perform a function corresponding to the similar sentence.

13. The computing apparatus of claim 10, wherein the processor is further configured to
    input the target sentence to a first model among the models and train the first model to generate the target utterance template based on the target sentence, and input the target utterance template to a second model among the models and train the second model to generate the target sentence based on the target utterance template.

14. The computing apparatus of claim 13, wherein
the trained first model is a model used to generate the similar utterance template, and
the trained second model is a model used to generate the similar sentence.

15. The computing apparatus of claim 13, wherein the trained second model is configured to generate the similar sentence based on a corpus through training and the similar utterance template.

16. The computing apparatus of claim 10, wherein the processor is further configured to train a classifier configured to classify an intent of an input sentence based on the target sentence and the similar sentence.

17. The computing apparatus of claim 16, wherein the trained classifier is configured to
receive, as an input, sentence data corresponding to a speech signal of a user,
determine an intent of the sentence data, and
output a result indicating that a function corresponding to the determined intent is not to be performed, in response to the determined intent corresponding to an OOS label of the target service.

18. An instruction execution method, comprising:
identifying a service associated with an input sentence;
determining an intent of the input sentence using a classifier corresponding to the identified service; and
performing one of a function corresponding to the determined intent and processing of the input sentence as an error, based on whether a response to the determined intent is out-of-service (OOS).

19. The instruction execution method of claim 18, wherein the classifier is trained in advance based on a target sentence of the identified service and a similar sentence that is similar to the target sentence.

20. The instruction execution method of claim 19, wherein the similar sentence is generated by training models based on a target utterance template of the identified service and the target sentence generated from the target utterance template,
generating a similar utterance template that is similar to the target utterance template based on a first model, among the trained models, and a sentence generated from an utterance template of another service, and
generating the similar sentence that is similar to the target sentence based on a second model, among the trained models, and the similar utterance template.

21. The instruction execution method of claim 18, wherein the performing of the one of the function corresponding to the determined intent and the processing of the input sentence as an error comprises performing the function corresponding to the determined intent, in response to the determined intent not being OOS.

22. The instruction execution method of claim 18, wherein the performing of the one of the function corresponding to the determined intent and the processing of the input sentence as an error comprises performing the processing of the input sentence as an error, in response to the determined intent being OOS.

23. A non-transitory computer-readable storage medium storing instructions that, when executed by a processor, cause the processor to perform the method of claim 18.

24. An instruction execution method, comprising:
identifying, by an instruction execution system, an application operable by the instruction execution system and associated with an input sentence;
determining, by the instruction execution system, an intent of the input sentence to be out-of-service (OOS) with respect to the identified application using a classifier corresponding to the identified application; and
refusing, by the instruction execution system, to perform a function corresponding to the input sentence, in response to the determined intent being OOS with respect to the identified application.

* * * * *